United States Patent
Cui et al.

(10) Patent No.: US 9,328,644 B2
(45) Date of Patent: May 3, 2016

(54) EXHAUST SYSTEM AND METHOD OF ESTIMATING DIESEL PARTICULATE FILTER SOOT LOADING FOR SAME USING TWO-TIER NEURAL NETWORK

(71) Applicant: GM GLOBAL TECHNOLOGY OPERATIONS LLC, Detroit, MI (US)

(72) Inventors: John X. Cui, Rochester Hills, MI (US); Min Sun, Troy, MI (US); Anthony B. Will, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 414 days.

(21) Appl. No.: 14/034,615

(22) Filed: Sep. 24, 2013

(65) Prior Publication Data

US 2015/0088398 A1    Mar. 26, 2015

(51) Int. Cl.
| | |
|---|---|
| F01N 3/02 | (2006.01) |
| F01N 11/00 | (2006.01) |
| F01N 3/023 | (2006.01) |
| F02D 41/14 | (2006.01) |
| F02D 41/24 | (2006.01) |
| F02D 41/02 | (2006.01) |
| F01N 9/00 | (2006.01) |

(52) U.S. Cl.
CPC ............... *F01N 11/00* (2013.01); *F01N 3/023* (2013.01); *F01N 9/005* (2013.01); *F01N 11/002* (2013.01); *F02D 41/1405* (2013.01); *F02D 41/1448* (2013.01); *F02D 41/2432* (2013.01); *F01N 9/002* (2013.01); *F01N 2900/08* (2013.01); *F01N 2900/1606* (2013.01); *F02D 41/029* (2013.01); *F02D 41/1467* (2013.01); *F02D 2200/0812* (2013.01)

(58) Field of Classification Search
CPC ......... F01N 9/002; F01N 9/005; F01N 9/007; F01N 11/002; F01N 3/023; F01N 3/0233; F01N 3/0871
USPC .................................................. 60/277–297
See application file for complete search history.

(56) References Cited

U.S. PATENT DOCUMENTS

| | | | | |
|---|---|---|---|---|
| 5,625,750 | A * | 4/1997 | Puskorius | F01N 11/00 123/672 |
| 5,781,700 | A * | 7/1998 | Puskorius | F02D 41/1405 706/14 |
| 6,336,084 | B1 * | 1/2002 | Omara | F01N 9/005 60/274 |
| 2004/0055279 | A1 * | 3/2004 | Plote | F01N 9/002 706/19 |
| 2007/0174222 | A1 * | 7/2007 | Daneau | F01N 9/002 706/19 |
| 2011/0219746 | A1 * | 9/2011 | Yezerets | F01N 3/035 60/274 |
| 2015/0308321 | A1 * | 10/2015 | Zhang | F01N 9/005 60/286 |

* cited by examiner

*Primary Examiner* — Thomas Moulis
(74) *Attorney, Agent, or Firm* — Quinn Law Group, PLLC

(57) ABSTRACT

A method of estimating soot loading in a diesel particulate filter (DPF) in a vehicle exhaust system includes estimating an engine-out soot rate using a first neural network that has a first set of vehicle operating conditions as inputs. The method further includes estimating DPF soot loading using a second neural network that has the estimated engine-out soot rate from the first neural network and a second set of vehicle operating conditions as inputs. Estimating the engine-out soot rate and estimating the DPF soot loading are performed by an electronic controller that executes the first and the second neural networks. The method also provides for training the first and second neural networks both offline (for initial settings of the neural networks in the vehicle), and online (when the vehicle is being used by a vehicle operator). An exhaust system has a controller that implements the method.

16 Claims, 4 Drawing Sheets

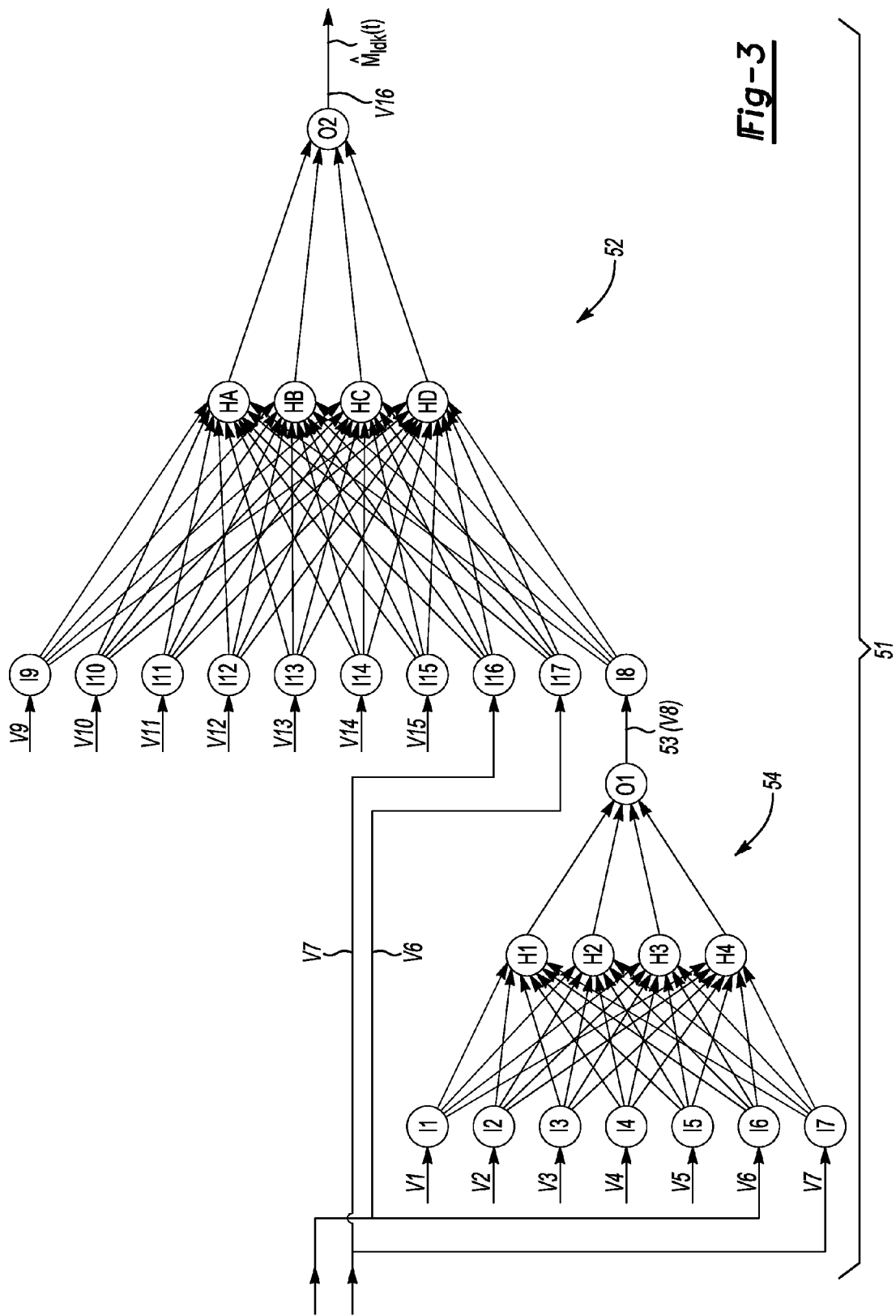

EXHAUST SYSTEM AND METHOD OF ESTIMATING DIESEL PARTICULATE FILTER SOOT LOADING FOR SAME USING TWO-TIER NEURAL NETWORK

TECHNICAL FIELD

The present teachings generally include a method of estimating soot loading in a diesel particulate filter and an exhaust system implementing the method.

BACKGROUND

Diesel particulate filters (DPFs) are designed to remove soot from the exhaust flow of a diesel engine. When the accumulated soot reaches a predetermined amount, the filter is "regenerated" by burning off the accumulated soot. There is no mechanism available to directly measure the amount of soot in the exhaust flow from the engine, or the amount of soot in the DPF when the vehicle is in use. Accordingly, mathematical and empirical soot models have been used to estimate the amount of soot present in the DPF so that timely disposal or regeneration of the DPF can be assured. Modeling the exhaust flow and resultant DPF loading is dependent on complex chemical reactions and physical flow dynamics. Many models utilize multiple lookup tables and parameters, all of which require lengthy and labor intensive engine and vehicle testing and calibration work.

Accuracy of the soot model used is important, as the DPF functions optimally when the amount of soot present is below a predetermined amount. One soot loading model is dependent upon a pressure differential across the DPF. However, the measurement of the pressure differential is less accurate when the exhaust flow rate is relatively low. An accurate soot model ensures that the DPF is not regenerated unnecessarily at relatively low soot concentrations (grams of soot per volume of filter), thus enhancing fuel economy.

SUMMARY

A method of estimating soot loading in a DPF in a vehicle exhaust system is provided that uses a two-tier neural network. The method uses a first neural network of the two-tier neural network to estimate an engine-out soot rate. The first neural network has a first set of vehicle operating conditions as inputs. The engine-out soot rate is an amount of soot per unit of time (such as in grams per hour) in the exhaust flow to the DPF. The method further includes estimating DPF soot loading using a second neural network of the two-tier neural network that has the estimated engine-out soot rate from the first neural network and a second set of vehicle operating conditions as inputs. An electronic controller executes the first and the second neural networks. The method also provides for training the first and second neural networks both offline (for initial settings of the neural networks in the vehicle), and online (when the vehicle is being used by a vehicle operator).

The method may include training the two-tier neural network using a pressure differential-based soot loading estimate. Accordingly, the method may include monitoring a pressure differential of the exhaust flow across the DPF, and estimating DPF soot loading according to a pressure-based model using the monitored pressure differential when the engine operating conditions are within a predetermined first set of engine operating conditions. The pressure-based model is a stored algorithm executed by the electronic controller. The neural networks are then trained utilizing the soot loading estimate of the pressure-based model as an output of the second neural network, and the vehicle operating conditions as inputs of the two-tier neural network.

An exhaust system for treating exhaust from an engine on a vehicle includes a DPF in exhaust flow communication with the engine, and a controller in operative communication with the engine and the exhaust system to determine vehicle operating conditions. The controller is configured to execute a two-tier neural network. The two-tier neural network includes a first neural network that estimates an engine-out soot rate and has a first set of vehicle operating conditions as inputs. The two-tier neural network further includes a second neural network that estimates DPF soot loading and has the engine-out soot rate from the first neural network and a second set of vehicle operating conditions as inputs.

The exhaust system may include a differential pressure measurement device that is operatively connected to the DPF and is operable to provide a signal corresponding with a pressure differential across the DPF. The controller is in operative communication with the differential pressure measurement device to monitor the pressure differential. A pressure-based model of DPF soot loading based on the pressure differential is used to train the two-tier neural network both offline and in real time.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 3 is a schematic illustration of the first and second neural networks of FIG. 2.

DETAILED DESCRIPTION

Figure 1:
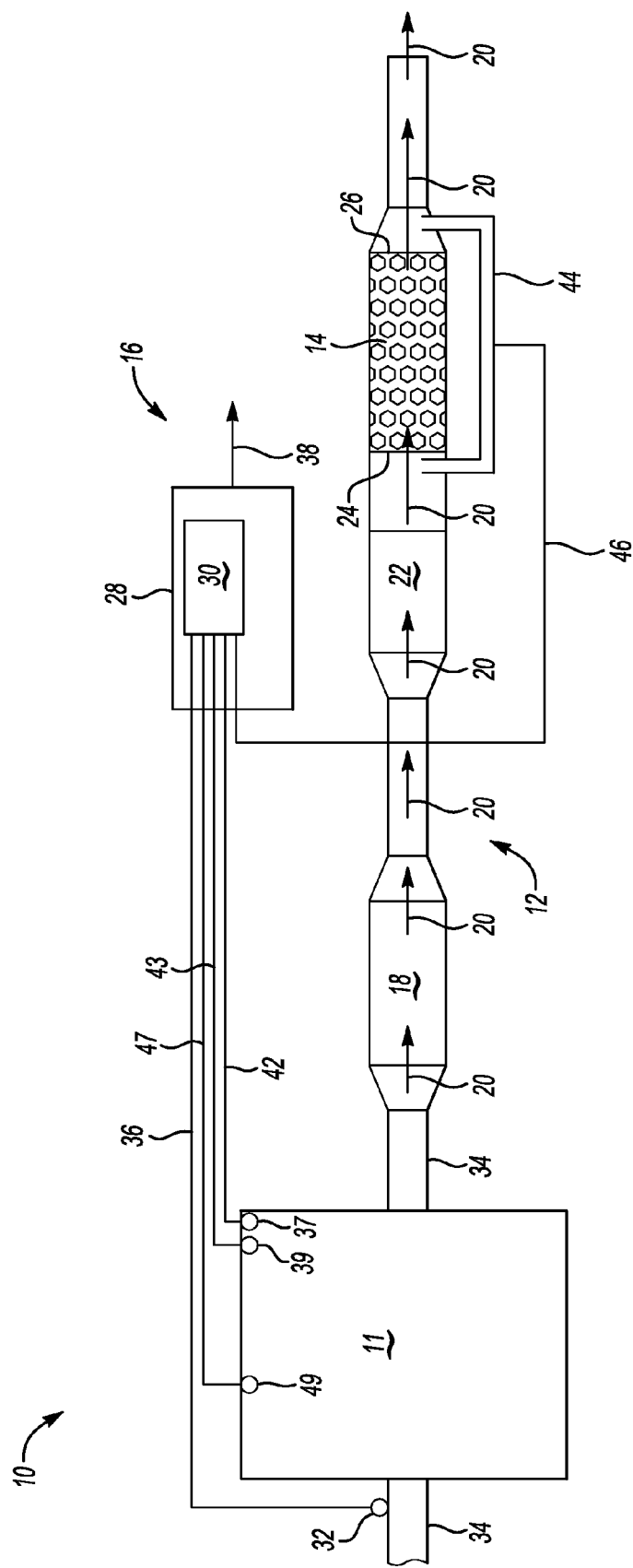
FIG. 1 is a schematic illustration of a vehicle exhaust system including a diesel particulate filter and a controller.

Referring to the drawings, wherein like reference numbers refer to like components throughout the several views, FIG. 1 shows a vehicle 10 that includes an engine 11 with a representative exhaust system 12 that includes a DPF 14. A monitoring system 16 for the DPF 14 is operable to monitor the amount of soot mass in the DPF 14 in order to ensure filter performance, enhance overall fuel economy and reduction of emissions, and provide for timely regeneration of the DPF 14.

The exhaust system 12 includes a diesel oxidation catalyst 18 that oxidizes and burns hydrocarbons in the exhaust flow 20 exiting the engine 11. Exhaust then flows through a selective catalytic reduction catalyst 22, which converts at least some of the nitrogen oxides in the exhaust flow 20 into water and nitrogen. Exhaust then flows from an inlet 24 of the DPF 14 to an outlet 26 of the DPF 14, and then exits the exhaust system 12. The exhaust system 12 may instead be arranged with the selective catalytic reduction catalyst 22 downstream of the DPF 14 without affecting the function of the monitoring system 16.

Figure 2:
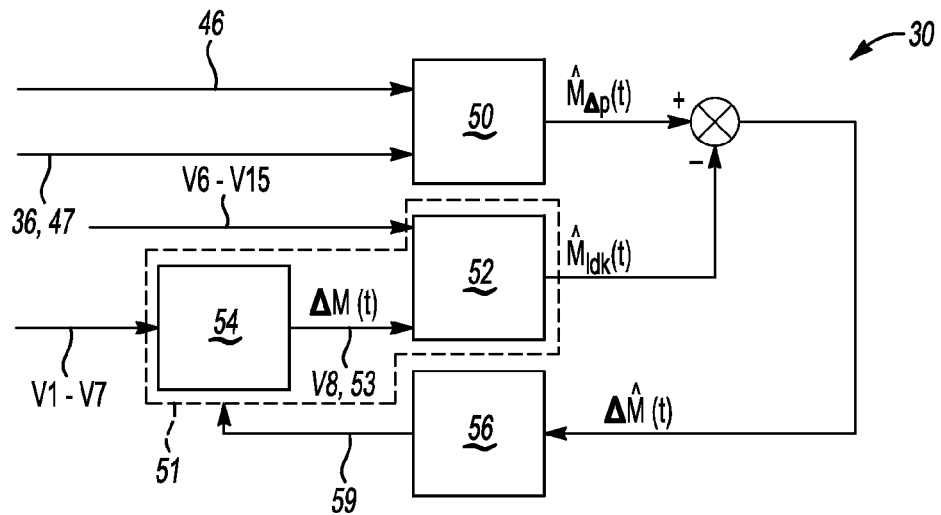
FIG. 2 is a schematic diagram of the controller of FIG. 1, including a processor with a first neural network estimating engine-out soot rate, a second neural network estimating DPF soot loading based partly on the estimated engine-out soot rate from the first neural network, a DPF soot loading pressure-based model, and a learning algorithm for the neural networks.

The monitoring system 16 includes a controller 28 that has a processor 30 that executes stored algorithms from a tangible, non-transitory memory, as described further with respect to FIG. 2, to estimate the amount of soot in the DPF 14 and, based on the estimate, output a control signal 38 when regeneration of the DPF 14 is warranted to cause engine operation at conditions (such as increased fuel amount) that initiate regeneration of the DPF 14. If the DPF 14 is a type that is actively regenerated by changing operating parameters to increase exhaust flow temperature to burn the soot, the signal 38 may affect engine parameters to cause the increase in temperature of the exhaust flow 20.

Data reflecting real-time operating parameters in the exhaust system 12 is input into the controller 28 and used by various ones of the stored algorithms as described herein. For example, the monitoring system 16 may include an engine speed sensor 32 positioned in operative communication with the engine crankshaft 34 and operable to monitor engine speed 36 (also referred to as a first engine operating condition) such as in revolutions per minute (rpm) and provide a signal representing engine speed to the processor 30. Additionally, the monitoring system 16 includes a sensor 37 that measures air fuel ratio in the engine 11 and provides an air fuel ratio 42 via a signal to the processor 30. The monitoring system 16 also includes a sensor 39 that measures air flow into the engine 11 and provides an air flow measurement 43 via a signal to the controller 28. A fuel flow measuring device 49 measures an injected fuel quantity rate 47 (also referred to as a second engine operating condition) such as the fuel flow in cubic millimeters per engine stroke ($mm^3$/cycle) into a fuel injection system for the engine 11. The fuel quantity rate 47 is provided as a signal to the processor 30. Fuel quantity rate 47 is proportional to engine load (e.g., torque at the crankshaft 34). Additional vehicle operating conditions, such as additional engine operating parameters and exhaust system 12 operating parameters can also be provided to the controller 28 and used by the algorithms stored on the processor 30 to estimate the amount of soot loading in the DPF 14. For example, exhaust temperature and other parameters can be monitored.

The monitoring system 16 also includes a differential pressure measurement device 44 that is operable to measure a third operating parameter, which is a pressure differential between exhaust flow at the inlet 24 and exhaust flow at the outlet 26 of the DPF 14. The differential pressure measurement device 44 is in fluid communication with the exhaust flow 20 at the inlet 24 and at the outlet 26 and emits a signal representative of a differential pressure 46 (also referred to as a pressure drop). The differential pressure 46 is utilized by the processor 30 as further described herein.

Referring to FIG. 2, the processor 30 is shown in more detail to represent the algorithms executed by and the empirical data accessed by the processor 30. The processor 30 includes a DPF soot loading pressure-based model 50 (also referred to as a first stored algorithm), that provides an inferred DPF soot loading estimate $\hat{M}_{\Delta p}(t)$ based in part on the differential pressure 46 provided by the pressure measurement device 44. The engine operating conditions 36, 47 are also provided to the pressure-based model 50. The pressure-based model 50 represents the dynamics of engine-out soot and DPF soot loading inferred from the pressure differential across the DPF 14. The pressure-based model 50 can include stored data based on prior testing, including offline weighings of the DPF 14 that are coordinated with measured pressure differentials and engine operating conditions.

Referring to FIGS. 2 and 3, the processor 30 includes a two-tiered neural network 51 that includes a first neural network 54 configured to provide an estimated engine-out soot rate 53. The two-tiered neural network 51 also includes a second neural network 52 that provides an estimated DPF soot loading value $\hat{M}_{1dk}(t)$. The second neural network 52 is dependent on the estimated engine-out soot rate 53 provided as an input signal from the first neural network 54. In other words, the estimated engine-out soot rate 53 is an input to the second neural network 52. In addition to inputs 36, 47 shown in FIG. 2, multiple additional vehicle operating conditions are used as inputs to the first neural network 54 and the second neural network 52 as indicated in Table I below.

The first and second neural networks 54, 52 are trained by exposure to various vehicle operating conditions. Neural networks are computer models that simulate nonlinear system behavior. The neural networks are built of processing elements (artificial neurons, referred to herein as nodes), including an input layer, one or more hidden layers, and an output layer. The number of nodes in each layer as well as the number of hidden layers is selected at the time of building the neural networks. In general, increasing the number of nodes in any of the layers and/or increasing the number of hidden layers may increase the precision of the network, but at the cost of greater processing resource. The input nodes receive various vehicle operating conditions from various sensors or computer modules. The vehicle operating conditions selected as inputs are those considered to be potentially relevant to the desired output, e.g., those relevant to the engine-out soot rate for the first neural network 54, and those relevant to the estimated DPF soot loading for the second neural network 52. Table I indicates the input variables provided as signals to the first neural network 54, and the input variables provided as signals to the second neural network 52.

TABLE I

| Node Receiving Input Signal | Input Signal for Input Layer of First Neural Network 54 (EO Soot Estimation) | Input Signals for Input Layer of Second Neural Network 52 (DPF Soot Loading Estimation) | Variable Vehicle Operating Condition Indicated By Input Signal | Unit |
|---|---|---|---|---|
| I1 | V1 | | engine speed | RPM |
| I2 | V2 | | APR (air fuel ratio) | |
| I3 | V3 | | EGR (Exhaust Gas Recirculation) | % |

TABLE I-continued

| Node Receiving Input Signal | Input Signal for Input Layer of First Neural Network 54 (EO Soot Estimation) | Input Signals for Input Layer of Second Neural Network 52 (DPF Soot Loading Estimation) | Variable Vehicle Operating Condition Indicated By Input Signal | Unit |
|---|---|---|---|---|
| I4 | V4 | | Fuel injection rail pressure | Mpa |
| I5 | V5 | | Fuel injection timing | Crank angle deg |
| I6/I17 | V6 | V6 | Fuel mass flow rate | kg/hr |
| I7/I16 | V7 | V7 | Air mass flow rate | g/s |
| O1/I8 | | V8 | Engine-Out (EO) Soot Rate | g/hr |
| I9 | | V9 | Lambda (λ) | |
| I10 | | V10 | Exhaust gas mass flow rate | kg/hr |
| I11 | | V11 | DOC inlet temperature | deg C. |
| I12 | | V12 | DOC outlet temperature | deg C. |
| I13 | | V13 | DPF inlet pressure | mbar |
| I14 | | V14 | DPF inlet temperature | deg C. |
| I15 | | V15 | DPF outlet temperature | deg C. |

The first neural network 54 used to estimate the engine-out soot rate (in grams per hour) has seven inputs V1-V7 each provided to a respective input node I1-I7. The input nodes I1-I7 make up the input layer for the first neural network 54. The second neural network 52 used to estimate the DPF soot loading (in grams) has ten inputs V6-V15 each provided to a respective input node I8-I17. The input nodes I8-I17 make up the input layer of the second neural network 52. Input signals V6 and V7, representing fuel mass flow rate and air mass flow rate, are input signals to both the first neural network 54 (at input nodes I6, I7) and the second neural network 52 (at input nodes I16, I17). Input variable I9, lambda (λ), is the ratio of a calculated air/fuel ratio in the engine to a stoichiometric air/fuel ratio. The input signal V8, engine-out soot rate in grams/hour, is provided to input node I8 of the second neural network 52 is the output engine-out soot rate 53, which is provided as a signal output of the output node O1 of the first neural network 54. For this reason, the neural networks 52, 54 are referred to together as a two-tier neural network 51, with the first neural network 54 being the first tier, and the second neural network 52 being the second tier.

The precise mathematical calculations performed on the data input to a neural network are a function of the specific network design. The design of a neural network is characterized by two main components. The first component is the overall network architecture which specifies the number of layers of nodes, the number of nodes in each layer and the specific input and output signals to the system. The number of input nodes, hidden layers, number of hidden nodes, and number of nodes in the output layers of the neural network 51 shown in FIG. 3 are for purposes of non-limiting example and represent only one possible embodiment. Within the scope of the claimed invention, different numbers of nodes and hidden layers can be used for the neural network.

The second component of a neural network design is the specific network weights and activation functions which govern the interaction between nodes. The internal architecture of each individual node in a neural network is identical, regardless of the layer in which it resides. This architecture consists of two separate parts: an algebraic operator which computes an input signal to a node based on a specific linear combination of output signals from the previous layer of nodes, and an activation function which converts this input signal into some output value. Thus, the output of a node in any given layer of the network (except the input layer) is completely determined by the output signals from the nodes in the previous layer.

In FIG. 3, the first neural network 54 is shown with only one hidden layer composed of four hidden nodes H1, H2, H3, and H4. The number of nodes in the hidden layer may be varied as desired to address the complexity of the modeled system, and four hidden nodes are used in the first neural network 54 by way of non-limiting example only. Each of the input nodes I1-I7 provides a signal to each of the hidden nodes H1-H4 as indicated by forward arrows from input nodes I1-I7 to hidden nodes H1-H4. The signal provided is correlated with the respective input signal V1-V7 depending on a weight assigned to the input signal. Each of the four hidden nodes H1-H4 then computes an input signal to the output node O1 (as indicated by forward arrows) that is based on a specific linear combination of output signals from the previous layer of nodes (i.e., in this embodiment, the input layer of nodes I1-I7), and an activation function which converts this input signal into some output value. The output node O1 then converts these signals into an output signal V8 representative of estimated engine-out soot rate 53, and the output signal V8 serves and the input signal to the input node I8 of the second neural network 52.

The second neural network 52 is also shown with only one hidden layer having four hidden nodes HA, HB, HC, and HD. The number of nodes in the hidden layer may be varied as desired to address the complexity of the modeled system, and four hidden nodes are used in the second neural network 52 by way of non-limiting example only. Each of the input nodes I8-I17 provides a signal to each of the hidden nodes HA-HD as indicated by forward arrows from input nodes I8-I17 to hidden nodes HA-HD. The signal provided is correlated with the respective input signal V6-V15 depending on a weight assigned to the input signal. Each of the four hidden nodes HA-HD then computes an input signal to the output node O2, as indicated by forward arrows, that is based on a specific linear combination of output signals from the previous layer of nodes (i.e., in this embodiment, the input layer of nodes I6-I15), and an activation function which converts this input signal into some output value. The output node O2 then converts these signals into an output signal V16 representative of estimated DPF soot loading value $\hat{M}_{1dk}(t)$.

Figure 6:
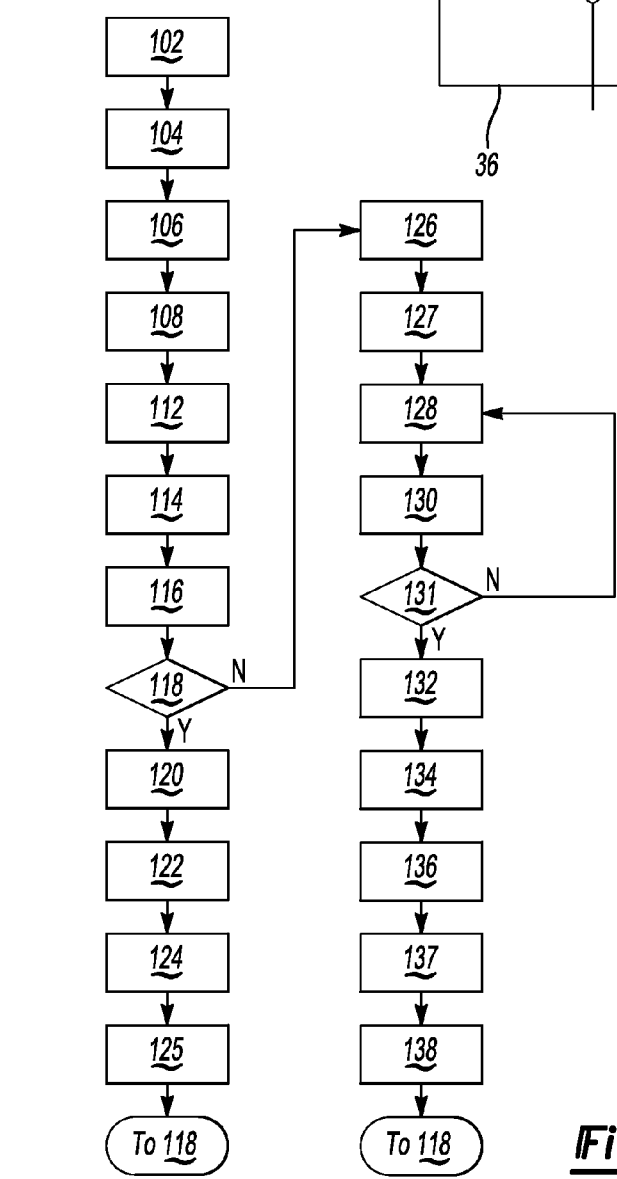
FIG. 6 is a schematic flow diagram of a method of estimating soot loading carried out by the controller of FIG. 1 via the neural networks, pressure-based model, and learning algorithm of FIG. 2.

Referring to FIG. 6, a method 100 of estimating DPF soot loading using the two-tier neural network 51 is provided that includes offline training of the neural networks 52, 54, and real-time training of the neural networks 52, 54. Real time training includes an enable mode in which the DPF soot loading value provided by the pressure based model 50 is relied on to train the neural networks, and in a disable mode during which the pressure-based model 50 is not relied on to train the neural networks.

Under the method 100 shown in FIG. 6, the neural networks 52, 54 can first be trained offline to provide suitable weightings for each of the nodes so that the estimated soot loading value $\hat{M}_{1dk}$ (t) provided by the two-tier neural network 51 will be representative over an entire range of expected vehicle operating conditions. The same initial node values are thus provided in the neural networks 54, 52 on like controllers 28 of all vehicles having like engines and vehicle exhaust systems. The controller 28 is then equipped to also update or customize the node values in real time based on the vehicle operating conditions encountered by the particular vehicle on which the controller 28 is installed.

Offline training of the neural networks 52, 54 is conducted by driving the vehicle 10 while monitoring and collecting data on vehicle operating conditions in step 102, or operating the engine on a dynamometer under controlled conditions. Additionally, the DPF 14 is periodically removed and weighed in step 104. The incremental increase in weight of the DPF 14 between each of the weighings can be calculated and distributed to the engine operating points in step 106 using an algorithm according to engine operating conditions that may include air/fuel ratio (AFR), fuel amount (e.g., fuel mass flow rate in kg/hr), engine speed (in rpm), and time spent at each of the engine operating points. This set of data (distributed DPF weights) is used as the desired output of the two-tier neural networks 51 corresponding to input signals of the collected vehicle operating conditions of step 102. Any number of suitable neural network training strategies, such as back propagation, can be used in step 108 to train the node values based on the input values of step 102 and desired outputs of step 106.

After a predetermined number of periodic weighings, distributions, and training of the node values in steps 102-108, the neural networks 54, 52 are considered to be adequately trained such that a controller 28 with a two-tier neural network 51 will provide reasonably accurate soot loading values. A vehicle model line having the same type of engine 11 and exhaust system 12 can thus be equipped with a controller 28 having a processor 30 with neural networks 52, 54 having these initial node values. Thus, steps 102-108 need not be performed for every controller 28 on every vehicle, but are performed for a predetermined number (at least one) of like vehicles during offline testing to provide the initial node values to be used in the controllers 28 of all like vehicles.

Online training occurs once a particular vehicle is placed in use by a customer, as the controller 28 is configured to train the neural networks 54, 52 in "real time" to better estimate DPF soot loading as influenced by the specific operating conditions experienced by the vehicle 10. The controller 28 utilizes a learning algorithm 56 that provides an output 59 that is used for training the first neural network 54 and the second neural network 52 under all engine operating conditions using a comparison of the estimated soot loading by the pressure-based model 50 and the estimated soot loading by the second neural network 52. By training the first neural network 54 and the second neural network 52 under all engine operating conditions, the second neural network 52 can provide a more accurate DPF soot loading estimate under all vehicle and engine operating conditions. The pressure-based model 50 may more accurately reflect actual DPF soot loading than does the second neural network 52 under a first set of engine operating conditions (the enable mode), and can thus be used as a check to update the first and second neural networks 54 and 52. However, the pressure-based model 50 is less accurate under other engine operating conditions (a second set of engine operating conditions called the disable mode). For example, at low engine speeds, or non-steady (transient) driving, the differential pressure 46 is less correlated with DPF soot loading than at high-speed, steady driving.

The learning algorithm 56 enables the first neural network 54 and 52 to be trained (such as by back propagation) to reflect engine operation in the disable mode as well as in the enable mode, as described herein. In other words, the learning algorithm 56 extends updating of the first neural network 54 and the second neural network 52 to an entire engine operating range (which is defined as the total of the first set of engine operating conditions and the second set of engine operation conditions). The learning algorithm 56 continuously trains the first and second neural networks 54, 52 to provide a better DPF soot loading estimate than that provided by the pressure-based model 50.

The learning algorithm 56 thus operates in one of two different operating modes: the disable mode or the enable mode, dependent on the engine operating conditions. In the disable mode, measurement of the differential pressure 46 is relatively inaccurate. The disable mode is defined as the engine operating conditions 36, 47 (such as indicated by the input signals I1, I6) being within the second set of engine operating conditions. In the disable mode, there is no real-time learning for (i.e., updating of) the first and second neural networks 54, 52. The second set of engine operating conditions reflects low speed driving and/or start-stop driving. In the enable mode, the measured differential pressure 46 is relatively accurate, and the learning algorithm 56 provides real-time learning of the first and second neural networks 54, 52 as described herein. The learning algorithm 56 determines and saves certain operating parameters during the disable mode, and then updates the first and second neural networks 54, 52 based on the saved operating parameters when the engine operating conditions return to the enable mode. Accordingly, the learning algorithm 56 is effective to update the first and second neural networks 54, 52 for all engine operating conditions, either in real time or at a later time, as described herein.

The learning algorithm 56 accomplishes different tasks depending on whether it is in the enable mode, the disable mode, or transitioning from the disable mode to the enable mode. These tasks are described in detail herein, and are included in the method of estimating DPF soot loading 100 carried out by the controller 28 and the processor 30 thereon, as schematically illustrated in FIG. 6. In step 112, the controller 28 monitors vehicle operating conditions, including engine operating conditions such as engine speed 36 (represented by input signal I1) and fuel quantity rate 47 (represented by input signal I6). Engine speed 36 can be in revolutions per minute (rpm). Fuel quantity rate 47 can be in mm$^3$/cycle, which can be converted into kilograms per hour (kg/hr). The controller 28 thus tracks actual vehicle operating conditions, including engine operating points within the range of engine operating conditions, by periodically analyzing the engine speed 36 and fuel quantity rate 47 provided. The controller 28 also has a timer that measures the time of operation at each monitored engine operating point in step 114. The controller 28 also periodically monitors the differential pressure 46 provided by the pressure differential measurement device 44 in step 116. Steps 112, 114, 116 are repeated periodically throughout the method 100.

Based on the engine operating conditions determined in step 112, the controller 28 determines in step 118 whether the current engine operating conditions (i.e., the most recent monitored engine operating conditions) are within the first set of engine operating conditions. If the engine operating conditions are within the first set of engine operating conditions, then the learning algorithm 56 is in the enable mode, and the controller 28 accomplishes steps 120-125 as described herein.

In the enable mode, the measured differential pressure 46 can be relied upon to accurately reflect the amount of accumulated soot in the DPF 14, and the pressure-based model 50 can thus be used to train both of the neural networks 52, 54, directly. In step 120, the inferred DPF soot loading $\hat{M}_{\Delta p}(t)$ is calculated from the differential pressure 46 ($\Delta P$) measurement via the pressure-based model 50.

In step 122, estimated DPF soot loading $\hat{M}_{1dk}(t)$ is then provided by the second neural network 52. A soot loading error $\Delta \hat{M}(t)$ (also referred to as a soot loading difference) is then calculated in step 124 by subtracting the estimated DPF soot loading $\hat{M}_{1dk}(t)$ from the inferred DPF soot loading $\hat{M}_{\Delta p}(t)$:

$$\Delta \hat{M}(t) = \hat{M}_{\Delta p}(t) - \hat{M}_{1dk}(t).$$

The controller 28 then trains the first and second neural networks 54, 52 in step 125 using the learning algorithm output 59 for the enable mode, which includes the soot loading difference of step 124 and the vehicle operating conditions of step 112 as inputs to nodes I1-I17 and I9-I17. Training can be via any suitable training strategy, such as back propagation. Any one of a number of neural network training strategies, such as back propagation, can be applied in step 125. Those skilled in the art will readily understand the availability of neural network training algorithms, such as back propagation algorithms. For example, using the soot loading error $\Delta \hat{M}(t)$, a back propagation algorithm is applied in step 125 to train the first neural network 54. The second neural network 52 is also trained in step 125 using the soot loading error $\Delta \hat{M}(t)$ and applying the back propagation algorithm, and taking the output 53 of the first neural network 54 as an input to the second neural network 52.

After steps 120 to 125, the method returns to step 118. If it is then determined in step 118 that the engine operating conditions are in the disable mode, then at this transition from the enable mode to the disable mode, the learning algorithm 56 accomplishes steps 126-138 of the method 100. First, the method 100 moves to step 126 in which the last soot loading estimate $\hat{M}_{\Delta p}(t)$ based on the pressure-based model 50 during engine operation in the enable mode is saved. The last soot loading estimate $\hat{M}_{1dk}(t)$ based on the second neural network 52 during engine operation in the enable mode is saved in step 127.

Figure 4:
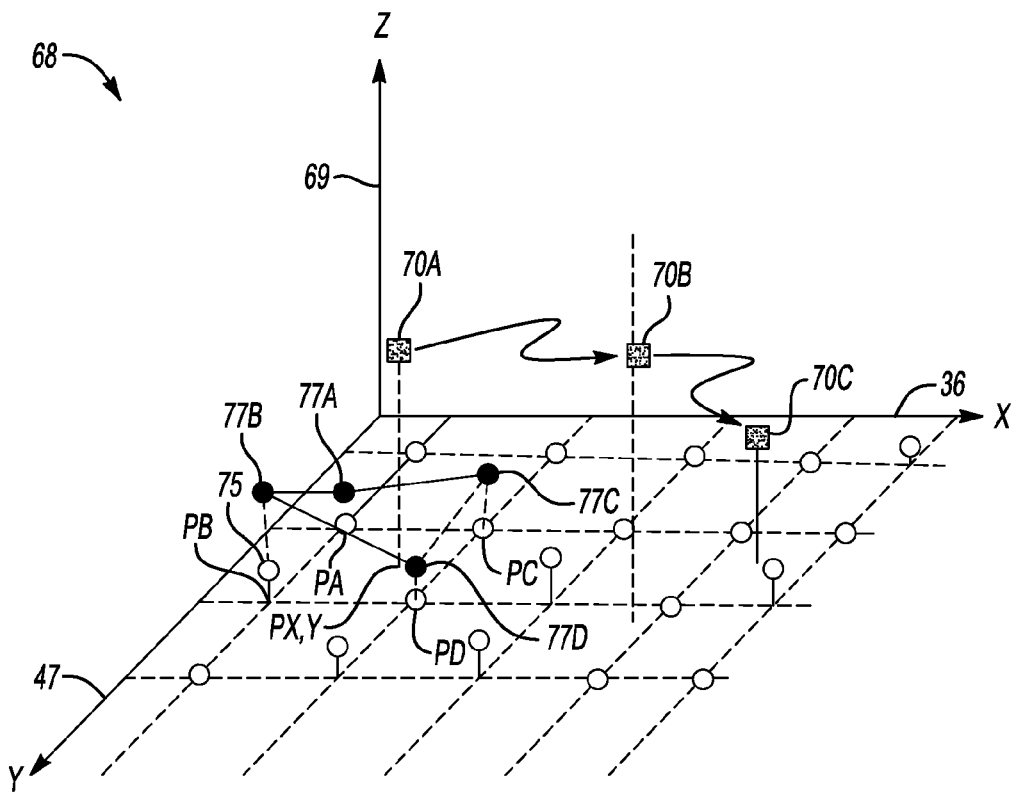
FIG. 4 is a schematic three-dimensional plot of operation time at various engine operating points according to engine speed and injected fuel quantity rate, and the distribution of operation at one engine operating point to predetermined engine operating points

Once in the disable mode, a lookup table 68 shown in FIG. 4 (named "Operation Time Table") is constructed under the method 100 to record the engine operation time 70A, 70B, 70C at different engine operating points such as engine operation time 70A at engine operating point $P_{x,y}$. Engine operation time 69 as determined in step 114 is stored according to engine speed 36 and fuel quantity rate 47. For example, at engine operating point $P_{x,y}$ (e.g., corresponding with the engine operating point at which time 70A is spent), let the engine operation time be $T_{x,y}$, and then $T_{x,y}$ will be distributed and recorded at the four adjacent junction points PA, PB, PC, PD surrounding $P_{x,y}$ as described below.

Figure 5:
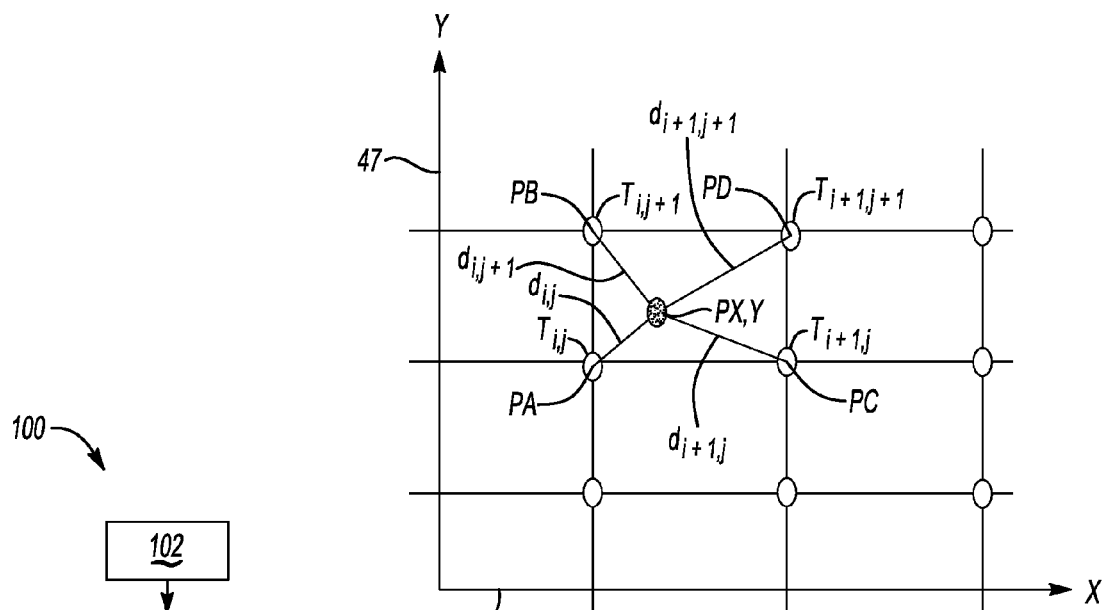
FIG. 5 is a schematic illustration of a time table showing an engine operating point and the distribution of operation time at predetermined engine operating points having various engine speeds and at different injected fuel quantity rates.

The four adjacent junction points in the Operation Time Table 68 are PA, PB, PC, PD (referred to as $T_{i,j}$, $T_{i,j+1}$, $T_{i+1,j}$, and $T_{i+1,j+1}$.) The distance from the engine operating point $P_{x,y}$ to its four adjacent junction points P1, P2, P3, P4 is $d_{i,j}$, $d_{i,j+1}$, $d_{i+1,j}$, and $d_{i+1,j+1}$ respectively, as shown in the two-dimensional time table of FIG. 5, and these distances can be calculated in step 128 by using the geometric distance formula for determining the distance between two points in a plane. For example, the distance $d_{i,j}$ from point $P_{x,y}$ to point P1 is:

$$d_{i,j} = \sqrt{(x-i)^2 + (y-j)^2}.$$

The total distance d from the engine operating point $P_{x,y}$ to these four adjacent points is:

$$d = d_{i,j} + d_{i,j+1} + d_{i+1,j} + d_{i+1,j+1}.$$

In step 130, the engine operation time 70A at the engine operating point $P_{x,y}$ is distributed to the four adjacent engine operating points PA, PB, PC, PD according to the proximity of each of the four points to the engine operation point $P_{x,y}$ at which the time 70A was measured. Then, corresponding to the engine operating point $P_{x,y}$ the engine operation time distributed in step 130 at each adjacent point (i, j) in the Operation Time Table 68 is as follows:

$$T_{i,j}(t) = T_{i,j}(t-1) + kT_{x,y} \frac{d_{i,j}}{d};$$

$$T_{i,j+1}(t) = T_{i,j+1}(t-1) + kT_{x,y} \frac{d_{i,j+1}}{d};$$

$$T_{i+1,j}(t) = T_{i+1,j}(t-1) + kT_{x,y} \frac{d_{i+1,j}}{d}; \text{ and}$$

$$T_{i+1,j+1}(t) = T_{i+1,j+1}(t-1) + kT_{x,y} \frac{d_{i+1,j+1}}{d};$$

where $0 \leq k \leq 1$ is a distribution gain determined by experiment to keep the learning process (i.e., the updating) stable. The prior accumulated time 75 (if any) for operation during the second set of engine operating conditions at each of these points is shown with open circles in FIG. 4 (only one of which is labeled 75). The updated accumulated time 77A, 77B, 77C, 77D is shown at each of the four points.

In step 131, it is then determined whether the engine operating conditions have returned to the enable mode. If they have not, then the method 100 returns to step 128 and continues to distribute time accumulated at a subsequent periodic engine operating point into the Operation Time Table 68 as described. When monitoring under step 131 indicates that engine operating conditions have returned to the enable mode, reliance in real time on DPF soot loading estimate $\hat{M}_{\Delta p}(t)$ of the pressure-based model 50 is resumed. The pressure-based model 50 is used to calculate the DPF soot that accumulated during the time when the DPF $\Delta P$ measurement was disabled (i.e., during the prior disable mode). Soot loading determined to have occurred during the disable mode is distributed into each engine operating point during the disable mode according to the time spent thereon. In order to transition from the disable mode to the enable mode, in step 132, the soot loading increment error $\hat{M}(t_e)$ (also referred to as a soot loading increment difference) during the disable mode is calculated as follows:

$$\Delta \hat{M}(t_e) = [\hat{M}_{\Delta p}(t_e) - \hat{M}_{\Delta p}(t_d)] - [\hat{M}_{1dk}(t_e) - \hat{M}_{1dk}(t_d)];$$

where, referring to FIG. 2, $\hat{M}_{1dk}(t_e)$ is the output of the second neural network 52, $\hat{M}_{\Delta p}(t_e)$ is the output of the pressure-based model 50; and $t_d$ and $t_e$ are the time of entering the disable mode (i.e., time at the first recorded engine operating point in the second set of engine operating conditions as determined in step 118 after steps 120-125), and the time of entering the enable mode (i.e., time at the first recorded engine operating point in the first set of engine operating conditions after operation in the second set of engine operating conditions as determined in step 131), respectively.

Next, in step 134, the average total soot rate error $\overline{M}$ (also referred to as the average total soot rate difference) during the disable mode is calculated as follows:

$$\Delta \overline{M} = \frac{\Delta \hat{M}(t_e)}{t_e - t_d}.$$

In step 136, the average total soot rate error $\overline{M}$ is distributed to each junction point, where the accumulated time is recorded during the disable mode in the Operation Time Table 68, proportionally to the recorded accumulated time as an average soot rate error $Z_{i,j}(t)$:

$$Z_{i,j}(t) = Z_{i,j}(t-1) + [T_{i,j} \Delta \overline{M}].$$

In step 137, the two-tier neural network is trained using vehicle operating conditions for each operating point occurring during the disable mode as inputs V1-V7, V-9-V17, and using the distributed average total soot rate error from step 136 to calculate the pressure-based model soot loading value for each such operating point to be used as the output O2. These values are the output 59 used to train the two-tier neural network 51 to reflect operation in the disable mode. Finally, in step 138, the operation time table 68 is cleared so that it is ready for use during a subsequent occurrence of operating in the disable mode following operation in the enable mode. The method 100 then returns to step 118, with steps 112, 114, and 116 continuing periodically.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A method of estimating soot loading in a diesel particulate filter (DPF) in a vehicle exhaust system, the method comprising:
   estimating an engine-out soot rate using a first neural network that has a first set of vehicle operating conditions as inputs; wherein the engine-out soot rate is for an engine in exhaust flow communication with the DPF; and
   estimating DPF soot loading using a second neural network that has the estimated engine-out soot rate from the first neural network and a second set of vehicle operating conditions as inputs; wherein said estimating the engine-out soot rate and said estimating DPF soot loading are performed by an electronic controller that executes the first and the second neural networks; and wherein the first and second neural networks are stored on the electronic controller.

2. The method of claim 1, further comprising:
   training the first and the second neural networks offline by
      recording the first and the second sets of vehicle operating conditions in real time at predetermined sample intervals as operating points;
      distributing a periodically-determined DPF weight to respective ones of said operating points occurring since an immediately preceding periodically-determined DPF weight; wherein each periodically-determined DPF weight is determined by periodically removing, weighing, and reinstalling the DPF; and
      updating nodes of the first neural network and the second neural network using the operating points as inputs to the nodes of the first and second neural networks and the distributed, periodically-determined weights as desired outputs of the second neural network.

3. The method of claim 2, wherein said updating nodes is by back propagation.

4. The method of claim 1, further comprising:
   monitoring a pressure differential of the exhaust flow across the DPF;
   training the two-tier neural network according to a training algorithm using a pressure-based model for DPF soot loading based on the monitored pressure differential; and wherein the training algorithm, and the pressure-based model is are stored algorithms executed by the electronic controller.

5. The method of claim 4, wherein said training the first and second neural networks occurs in real time by
   updating nodes of the first neural network and the second neural network based in part on a difference between the estimated DPF soot loading of the pressure-based model and the estimated DPF soot loading of the second neural network
   when the engine operating conditions are within the first set of engine operating conditions; and
   updating node values of the first neural network and the second neural network after a return to engine operating conditions within the first set of engine operating conditions after operation in the second set of engine operating conditions, based in part on a saved estimated soot DPF soot loading value from an operating point in the first set of engine operating conditions prior to said operation in the second set of engine operating conditions.

6. The method of claim 5, further comprising:
   measuring time of operation at each operating point during the second set of operating conditions;
   calculating a total time between a last engine operating point in the first set of engine operating conditions prior to operation in the second set of engine operating conditions and a first engine operating point in the first set of engine operating conditions after a return from operation in the second set of engine operating conditions;
   calculating a first difference between the estimated DPF soot loading based on the pressure-based model and the estimated DPF soot loading based on the second neural network, both measured at the first engine operating point;
   calculating a second difference between the estimated DPF soot loading based on the pressure-based model and the estimated DPF soot loading based on the second neural network, both measured at the last engine operating point; wherein the estimated soot loading based on the pressure-based model at the last engine operating point is said saved estimated soot loading value;
   subtracting the second difference from the first difference to provide a soot loading increment error;
   dividing the soot loading increment error by the total time to provide an average total soot rate error; and
   wherein said updating node values of the first neural network and the second neural network after a return to operation within the first set of engine operating conditions is by (i) distributing a respective portion of the average total soot rate error to operating points occurring in the second set of engine operating conditions in proportion to said measured time of operation at each such operating point occurring in the second set of engine operating conditions to said total time, and (ii) performing back propagation of the first and second neural networks for each distributed respective portion at each of said operating points occurring in the second set of engine operating conditions.

7. The method of claim 6, wherein the measured time of operation at each such operating point occurring in the second set of engine operating conditions is saved in a time lookup table according to operating points within the second set of engine operating conditions, and further comprising:
resetting the time lookup table to clear the measured time following said updating after a return to engine operating conditions within the first set of engine operating conditions.

8. An exhaust system for treating exhaust from an engine on a vehicle, the exhaust system comprising:
a diesel particulate filter (DPF) in exhaust flow communication with the engine; and
a controller in operative communication with the engine and the exhaust system to determine vehicle operating conditions; wherein the controller is configured to execute:
a two-tier neural network that includes (i) a first neural network that estimates an engine-out soot rate and has a first set of vehicle operating conditions as inputs, and (ii) a second neural network that estimates DPF soot loading and has the estimated engine-out soot rate from the first neural network as an input.

9. The exhaust system of claim 8, further comprising:
a differential pressure measurement device operatively connected to the DPF and operable to provide a signal corresponding with a pressure differential across the DPF; wherein the controller is in operative communication with the differential pressure measurement device to monitor the pressure differential;
wherein the vehicle operating conditions include engine operating conditions;
wherein the controller is further configured to execute a pressure-based model of DPF soot loading based on the pressure differential; and
wherein the controller is configured to execute a learning algorithm that trains the two-tier neural network using a DPF soot loading estimate of the pressure-based model.

10. The exhaust system of claim 9, wherein the learning algorithm updates nodes of the two-tier neural network based in part on a difference in estimated soot loading between the pressure-based model and the second neural network (i) in real time when the engine operating conditions are within a first set of engine operating conditions, and (ii) after a return to operation within the first set of engine operating conditions after operation in a second set of engine operating conditions; wherein updating after a return to operation within the first set of engine operating conditions is based in part on a saved DPF soot loading estimate of the pressure-based model from an operating point in the first set of engine operating conditions prior to said operation in the second set of engine operating conditions.

11. The exhaust system of claim 10, wherein the controller is configured to train the two-tier neural network offline by
recording the first and the second sets of vehicle operating conditions in real time at predetermined sample intervals as operating points;
distributing a periodically-determined DPF weight to respective ones of said operating points occurring since an immediately preceding periodically-determined DPF weight; wherein each periodically-determined DPF weight is determined by periodically removing, weighing, and reinstalling the DPF; and
updating nodes of the first neural network and the second neural network using the operating points as inputs to the nodes of the first and second neural networks and the distributed, periodically-determined DPF weights as outputs of the second neural network.

12. The exhaust system of claim 9, wherein the controller is configured to train the first and second neural networks in real time by
updating nodes of the first neural network and the second neural network based in part on a difference between the estimated DPF soot loading of the pressure-based model and the estimated DPF soot loading of the second neural network;
wherein said updating nodes of the first neural network and the second neural network is performed by the electronic controller in real time when the engine operating conditions are within the first set of engine operating conditions; and
wherein said updating nodes of the first neural network and the second neural network is performed by the electronic controller after a return to engine operating conditions within the first set of engine operating conditions after operation in the second set of engine operating conditions, and is based in part on a saved estimated soot DPF soot loading value from an operating point in the first set of engine operating conditions prior to said operation in the second set of engine operating conditions.

13. The exhaust system of claim 12, wherein the controller is further configured to:
measure time of operation at each operating point during the second set of operating conditions;
calculate a total time between a last engine operating point in the first set of engine operating conditions prior to operation in the second set of engine operating conditions and a first engine operating point in the first set of engine operating conditions after a return from the second set of engine operating conditions;
calculate a first difference between the estimated DPF soot loading based on the pressure-based model and the estimated DPF soot loading based on the two-tier neural network, both measured at the first engine operating point in the first set of engine operating conditions after a return from the second set of engine operating conditions;
calculate a second difference between the estimated DPF soot loading based on the pressure-based model and the estimated DPF soot loading based on the two-tier neural network, both measured at the last engine operating point in the first set of engine operating conditions prior to operation in the second set of engine operating conditions; wherein the estimated soot loading based on the pressure-based model at the last engine operating point in the first set of engine operating conditions prior to operation in the second set of engine operating conditions is said saved estimated soot loading value;
subtract the second difference from the first difference to provide a soot loading increment error;
divide the soot loading increment error by the total time to provide an average total soot rate error; and
wherein said updating nodes of the first neural network and the second neural network after a return to operation within the first set of engine operating conditions is by (i) distributing a respective portion of the average total soot rate error to operating points occurring in the second set of engine operating conditions in proportion to said measured time of operation at each such operating point occurring in the second set of engine operating conditions to said total time, and (ii) performing back propagation of the first and second neural networks for each distributed respective portion at each of said operating points occurring in the second set of engine operating conditions.

14. The exhaust system of claim 13, wherein the controller is configured to save the measured time of operation at each such operating point occurring in the second set of engine operating conditions in a time lookup table according to operating points within the second set of engine operating conditions, and
reset the time lookup table to clear the measured time following said updating after a return to engine operating conditions within the first set of engine operating conditions.

15. A method of estimating soot loading in a diesel particulate filter (DPF) in a vehicle exhaust system, the method comprising:
estimating an engine-out soot rate using a first neural network that has a first set of vehicle operating conditions as inputs; wherein the engine-out soot rate is for an engine in exhaust flow communication with the DPF; wherein the first set of vehicle operating conditions includes engine operating conditions;
estimating DPF soot loading using a second neural network that has the estimated engine-out soot rate from the first neural network and a second set of vehicle operating conditions as inputs; wherein said estimating the engine-out soot rate and said estimating the DPF soot loading are performed by an electronic controller that executes the first and the second neural networks;
monitoring a pressure differential of the exhaust flow across the DPF;
updating the first and second neural networks by back propagation based in part on a difference in estimated soot loading between a pressure-based model and the second neural network (i) in real time when the engine operating conditions are within a predetermined first set of engine operating conditions, and (ii) after a return to operation within the first set of engine operating conditions after operation in a predetermined second set of engine operating conditions; and wherein said updating after a return to operation within the first set of engine operating conditions is based in part on a saved estimated soot loading value from an operating point in the first set of engine operating conditions prior to said operation in the second set of engine operating conditions.

16. The method of claim 15, further comprising:
measuring time of operation at each operating point during the second set of engine operating conditions; and
distributing an average total soot rate difference between the estimated DPF soot loading based on the second neural network and the estimated DPF soot loading based on the pressure-based model to the operating points during the second set of engine operating conditions according to said measured time of operation at each operating point during the second set of engine operating conditions.

* * * * *